(12) United States Patent
Yang et al.

(10) Patent No.: US 12,532,908 B2
(45) Date of Patent: Jan. 27, 2026

(54) HIGH-YIELD INTEGRATED PRODUCTION METHOD FOR CIGAR WRAPPERS

(71) Applicant: Tobacco Research Institute of Hubei Province, Wuhan (CN)

(72) Inventors: Chunlei Yang, Wuhan (CN); Jinpeng Yang, Wuhan (CN); Jun Yu, Wuhan (CN); Sicheng Liu, Wuhan (CN); Xiongfei Rao, Wuhan (CN); Kaixiao Fan, Wuhan (CN); Chuanzong Li, Wuhan (CN); Wenchang Huang, Wuhan (CN); Gang Liu, Wuhan (CN); Guangwei Sun, Wuhan (CN); Jingguo Sun, Wuhan (CN); Yulei Zhao, Wuhan (CN); Peijun Lv, Wuhan (CN); Youlun Fan, Wuhan (CN)

(73) Assignee: Tobacco Research Institute of Hubei Province, Wuhan (CN)

( * ) Notice: Subject to any disclaimer, the term of this patent is extended or adjusted under 35 U.S.C. 154(b) by 0 days.

(21) Appl. No.: 19/094,817

(22) Filed: Mar. 29, 2025

(65) Prior Publication Data

US 2025/0228283 A1 Jul. 17, 2025

Related U.S. Application Data

(63) Continuation of application No. PCT/CN2024/127471, filed on Oct. 25, 2024.

(30) Foreign Application Priority Data

Oct. 27, 2023 (CN) .......................... 202311408849.8

(51) Int. Cl.
| | | |
|---|---|---|
| *A24D 1/02* | (2006.01) | |
| *A01G 7/04* | (2006.01) | |
| *A01G 22/45* | (2018.01) | |
| *A01G 31/06* | (2006.01) | |
| *A24B 3/04* | (2006.01) | |
| *A24B 15/20* | (2006.01) | |
| *A24B 15/30* | (2006.01) | |
| *C05B 7/00* | (2006.01) | |
| *C05C 5/02* | (2006.01) | |
| *C05C 5/04* | (2006.01) | |
| *C05D 5/00* | (2006.01) | |
| *C05D 9/02* | (2006.01) | |
| *C05G 5/23* | (2020.01) | |

(52) U.S. Cl.
CPC ............... *A24D 1/02* (2013.01); *A01G 31/06* (2013.01); *A24B 3/04* (2013.01); *A24B 15/20* (2013.01); *C05B 7/00* (2013.01); *C05C 5/02* (2013.01); *C05C 5/04* (2013.01); *C05D 5/00* (2013.01); *C05D 9/02* (2013.01); *C05G 5/23* (2020.02); *A01G 7/045* (2013.01); *A01G 22/45* (2018.02)

(58) Field of Classification Search
None
See application file for complete search history.

(56) References Cited

PUBLICATIONS

CNIPA, Notification of a First Office Action for CN202311408849. 8, Oct. 10, 2024.
Hubei Tobacco Science Research Institute (Applicant), Replacement claims (allowed) of CN202311408849.8, Oct. 25, 2024.
CNIPA, Notification to grant patent right for invention in CN202311408849.8, Nov. 19, 2024.

*Primary Examiner* — Dennis R Cordray
(74) *Attorney, Agent, or Firm* — Zhigang Ma

(57) ABSTRACT

The invention discloses a high-yield integrated production method for cigar wrappers. This method builds a "four in one" production facility system that integrates seedling cultivation, transplanting, drying, and fermentation processes of cigar wrapper tobacco leaves. The system has a light intensity of 75-160 μmol/(m²·s), a temperature of 25±5° C. and a relative air humidity of 75%±10%; when transplanting tobacco seedlings, using a nutrient solution, which is a high iron boron nutrient solution with an iron content of 0.3-0.7 mM calculated as Fe and a boron content of 9.5-13.0 mg/L calculated as boric acid. The invention achieves a cigar shell yield of over 65%, a 40% reduction in production facility investment, and a 20% reduction in labor force by accurately regulating the production environment and the supply of growth factors such as nutrients and light.

6 Claims, No Drawings

HIGH-YIELD INTEGRATED PRODUCTION METHOD FOR CIGAR WRAPPERS

FIELD OF THE DISCLOSURE

The disclosure relates to a high-yield integrated production method for cigar wrappers.

BACKGROUND

Cigar wrapper tobacco is the most important component of raw materials for cigars (especially middle and high-end handmade cigars). High quality cigar wrappers require thin leaves, fine and straight veins, flat leaves, good oil content, uniformity, and no damage or holes. Its high quality requirements make production technology difficult. The production of cigar wrapper tobacco leaves in our country is still in its early stages, with seedling cultivation, transplanting, drying, and fermentation all carried out separately. The production front is long, occupying many production facilities, and the overall production technology is relatively extensive. The output rate of cigar wrapper is generally less than 10%. In recent three years, with technological advancements, some cigar wrapper production areas have initially achieved classified production of wrappers and cores. Personalized production technologies have been developed based on the quality requirements of wrappers and cores in various production processes such as variety, cultivation, drying, and fermentation. The yield of cigar wrappers has been greatly improved, but it is still generally below 30%. However, there is still a significant gap compared to the 60% output rate of high-quality cigar wrapper production areas such as Cuba and the Dominican Republic, which has led to a shortage of cigar wrapper raw materials in the domestic cigar industry and a heavy reliance on imports. It can be seen that optimizing the cultivation, planting, and production techniques of cigar tobacco leaves, and improving the yield of cigar wrappers, is currently the biggest technical challenge for major cigar tobacco production areas and cigar manufacturers.

In the traditional production technology of cigar wrappers, the entire production process is mainly divided into four stages: seedling cultivation, field planting, drying, and fermentation. Each link is relatively independent. Specialized seedling facilities, such as sunlight greenhouses or plastic steel greenhouses, are built in the seedling stage, and necessary ventilation and temperature control facilities are equipped. The process of transplanting tobacco seedlings and planting in the field includes field preparation, fertilization, ridge formation, mulching, topdressing, irrigation, and pest control and other field management work. This process involves multiple operational steps and high labor intensity, and is greatly affected by climatic conditions such as drought, flooding, wind disasters, hail, etc. It is difficult to control the light, temperature, water, and fertilizer in the field. In addition, due to the need to establish separate production facilities for drying and fermentation, the investment cost is high and the utilization rate of facility space is low, which does not conform to the current direction of efficient and intensive production technology development.

SUMMARY

In response to the shortcomings of the existing technologies mentioned above, the present invention provides a high-yield integrated production method for cigar wrappers, which is achieved through the following technologies.

The high-yield integrated production method for cigar wrappers includes the following steps:

Building a "four in one" production facility system that integrates seedling cultivation, transplanting, drying, and fermentation processes of cigar wrapper tobacco leaves, with a photosynthetic photon flux density (PPFD) of 75-160 $\mu mol/(m^2 \cdot s)$, a temperature of 25±5° C. and a relative air humidity of 75%±10% within the production facility system.

When transplanting tobacco seedlings, using a nutrient solution, which is a high iron boron nutrient solution with an iron content of 0.3-0.7 mM calculated as Fe and a boron content of 9.5-13.0 mg/L calculated as boric acid.

The transplantation of cigar wrapper tobacco leaves occupies the main space within the production facility system, and seedling cultivation, drying, and fermentation collectively occupy the remaining space within the production facility system; using 110-140 days as a cigar growing season, implement two or three seasons of intercropping per year.

It should be noted that the high-yield integrated production method for cigar wrappers in the present invention integrates the entire process of cigar seedling cultivation, transplanting, drying and fermentation. A complete set of methods has been developed to improve the yield of cigar wrappers, achieving intensive and efficient utilization of facility space in a "four in one" manner, and enhancing the high yield of cigar wrappers. In order to ensure the stability of tobacco cultivation environment, the entire production facility system is generally carried out in greenhouses. There are no special restrictions on the land occupation space of the production facility system, which can be adjusted according to local conditions. Small greenhouses, such as those occupying 20-30 $m^2$, can be planted, while larger ones, such as 2000 $m^2$ (6 spans per building) or 4000 $m^2$ (10 spans per building) on the ground, or even larger greenhouses can be planted.

It should be noted that the facilities, equipment, culture media, and nutrient solutions commonly used in seedling cultivation, transplanting, drying, and fermentation processes which are all used in the production facility system. Optionally, there is a nutrient solution pool during the seedling cultivation process. During the transplanting process, there are nutrient tanks, three-dimensional cultivation racks, planting brackets, planting containers, culture media, irrigation systems, etc. During the drying process, there are auxiliary tools such as sunshade nets, smoke drying racks, smoke drying poles, and smoke drying branches, as well as temperature and humidity control equipment to cope with extreme weather conditions. During the fermentation process, there are fermentation chambers, moisture-proof and dust-proof cloth, smoke stack temperature and humidity monitoring equipment, and internal control temperature and humidity control equipment in the fermentation room.

Preferably, 90% of the space in the production facility system is used for transplanting cigar wrapper tobacco leaves, and 10% is of the space in the production facility system used for seedling cultivation, drying, and fermentation of cigar wrapper tobacco leaves.

Preferably, the nutrient solution is prepared by dissolving large and medium-sized elemental reagents in water, and then adding iron salt mother liquid and trace element mother liquid.

In the nutrient solution, the supply of large and medium-sized elements includes 272 mg/L of calcium nitrate tetrahydrate, 404 mg/L of potassium nitrate, 109 mg/L of potassium dihydrogen phosphate, 61 mg/L of triammonium phosphate and 246 of mg/L magnesium sulfate, calculated as a pure N mass concentration of 0.01%.

The supply of iron in the nutrient solution includes 83.40-194.60 mg/L of ferrous sulfate heptahydrate and 111.65-260.55 mg/L of chelating agent EDTA-Na■2H2O, calculated as a concentration of 0.3-0.7 mM of pure Fe; the supply of trace elements in the nutrient solution includes potassium iodide 0.83 mg/L, boric acid 9.5-13.0 mg/L, manganese sulfate tetrahydrate 22.3 mg/L, zinc sulfate heptahydrate 8.6 mg/L, sodium molybdate dihydrate 0.25 mg/L, copper sulfate pentahydrate 0.025 mg/L, and cobalt chloride hexahydrate 0.025 mg/L.

Preferably, the method of using the nutrient solution is as follows:

During the 1-20 day of the transplanting process, the concentration of the nutrient solution is 0.03% with a total dosage is 3-5 L per plant.

During the 21-30 day of the transplanting process, the concentration of the nutrient solution is 0.045% with a total dosage of 5-7 L per plant; adding the nutrient solution on the 21st day is 50% of the remaining nutrients in the nutrient solution tank before supplementation.

During the 31-60 day of the transplanting process, the concentration of the nutrient solution is 0.06% with a total dosage is 7-10 L per plant; adding the nutrient solution once each on the 31st, 41st, and 51st days, and the amount of each supplement is 50% of the remaining nutrients in the nutrient solution tank before supplementation.

From the 61st day of the transplanting process, the concentration of the nutrient solution is 0.045% with a total dosage is 7-10 L per plant; adding the nutrient solution once each on the 61st and 71st day, and the amount of each supplement is 50% of the remaining nutrients in the nutrient solution tank before supplementation.

Preferably, on the 10th to 15th day after topping cigar wrapper tobacco leaves, replacing the nutrient solution with clean water to cut off nutrient supply; the interval between two adjacent harvests during harvesting is 12-18 days.

Preferably, the transplanting is carried out using 2-3 layers of cultivation racks for transplanting cigar wrapper tobacco leaves with a spacing of $\geq 2$ m between the layers of the cultivation racks; each layer of the cultivation rack except for the top layer adopts supplementary lighting measures with a supplementary PPFD of 50-150 μmol/(m²·s).

Preferably, the seedling cultivation of cigar wrapper tobacco leaves is carried out by rolling seedling cultivation in a 50 day cycle of intercropping; when using three season intercropping system, the second season seedling cultivation starts 50 days before the end of the first season tobacco harvest, and the third season seedling cultivation starts 50 days before the end of the second season tobacco harvest.

Preferably, the drying of cigar wrapper tobacco leaves is carried out on a foldable drying rack in the drying area; the last season of tobacco leaves is dried on foldable tobacco racks or cultivation racks every year.

Preferably, the fermentation of cigar wrapped tobacco leaves is carried out in a detachable fermentation room constructed with a rolling film in the area left vacant after drying.

The beneficial effect of the technical scheme proposed in the present invention is: the present invention aims to improve the yield of cigar wrapper tobacco leaves by organically integrating key agricultural production processes, including seedling cultivation, transplanting, drying, and fermentation, to achieve intensive and efficient production management. This method significantly improves the yield of cigar wrappers by accurately controlling production environmental factors such as temperature and humidity, as well as the supply of growth factors such as nutrients and light.

The ultimate yield of cigar wrappers can reach over 65%, the investment in production facilities can be reduced by over 40%, and the labor force can be reduced by over 20%. The incidence of pests and diseases has significantly decreased, the maturity of cigar wrappers has significantly improved, and the overall quality of appearance, physical processing performance, and sensory quality can be significantly better than traditional production modes.

DETAILED DESCRIPTION OF PREFERRED EMBODIMENTS

Below, the technical solutions in the embodiments of the present invention will be clearly and completely described in conjunction with the embodiments of the present invention. Obviously, the described embodiments are only a part of the embodiments of the present invention, not all of them. Based on the embodiments of the present invention, all other embodiments obtained by ordinary skilled persons in the art without creative labor are within the scope of protection of the present invention.

Unless otherwise specified in the following examples and comparative examples, conventional tobacco cultivation techniques are used for the seedling cultivation, transplanting, drying, and fermentation processes of cigar plants. For specific implementation, please refer to the technical content of cigar cultivation in Chapter 20, Section 5 of "Chinese Tobacco Cultivation" (edited by the Institute of Tobacco Research, Chinese Academy of Agricultural Sciences, November 2005).

Example 1

The integrated production method for high yield and yield of cigar wrapper provided in this embodiment was tested in 2023 in the greenhouse of Wuchang, Wuhan City, Hubei Province. The cigar wrapper variety is CX-26.

The production facility system includes a two-layer vertical cultivation rack (including a folding cantilever for placing tobacco drying rods during drying operations), nutrient solution tanks, planting pots, culture substrates, nutrient solutions, and ancillary accessories. 90% of the total space in production facilities is used for transplanting, and 10% is used for seedling cultivation, drying, and fermentation.

According to the growth and development law of cigar wrapper tobacco leaves, with a growth period of 140 days as one growing season, combined with the climatic characteristics of the planting area, appropriate temperature and humidity control equipment, and transplanting is carried out twice a year. The first season was transplanted in mid February and harvested in mid June. The second season will be transplanted in mid June and harvested in mid December.

The seedling cultivation, transplanting, drying, and fermentation processes and requirements for the cigar wrappers in this experiment are as follows:
1. Seedling Cultivation According to the conventional floating technology specifications, the seedling age is 50 days. Planting in two seasons per year, with seedlings planted in late November for the first season and in early May for the second season.
2. Transplanting
(1) Equipment and Material Requirements Planting pots: each nutrient tank is equipped with 10 planting pots.

Substrate: the universal peat type seedling substrate (prepared at a dry basis of 0.7 kg per plant) and decomposed cake fertilizer (prepared at a dry basis of 0.07 kg per plant); Moisturize with an appropriate amount of water and mix to achieve a weight of 1 kg per pot (including pot weight).

Nutrient solution tank: the tank is 20 cm deep and 20 cm wide, and its length depends on the ground space. The spacing between the planting plants is 45 cm, and the row spacing (the longitudinal center axis distance of the adjacent nutrient solution tank) is 1.0 m. The nutrient solution tank is lined with anti-seepage membrane, and a 4 cm wide and 6 cm high foam or wooden square is placed under the membrane to support the planting basin and leave space for root system extension.

Nutrient solution cover plate: to prevent the growth of algae and bacteria caused by direct sunlight, a cover plate that blocks sunlight should be added to the nutrient solution tank and placed around the periphery of the planting pot.

Cultivation rack: the vertical cultivation rack is set up in two layers, with a spacing of 2 m between the layers. The lower layer is equipped with supplementary lighting measures with a supplementary PPFD of 100 μmol/(m²·s).

Auxiliary equipment and consumables: oxygenation pump (1 per nutrient tank), several filter screens, lamp tubes (1 set per nutrient tank, PPFD of 100 μmol/(m²·s); other materials and consumables such as waterproof tape, zip ties, etc.

(2) Transplanting Operation

Prepare the substrate and place it in a pot: mix the decomposed cake fertilizer evenly into the conventional seedling substrate, and then place it in a pot. The substrate should be placed flat and not overly compacted. After filling the pot, gently place the planting pot onto the planting bracket.

Infusion of nutrient solution: the preparation method of nutrient solution refers to the requirements of "(3) Nutrient Solution" below. The depth of nutrient solution infusion is 3-4.5 cm below the customized pelvic floor.

Deep planting: the transplanting of tobacco seedlings is based on nutrient tanks as the basic carrier, with the tobacco seedling planting pot as the root support. The transplanting depth should reach a distance of ≥3 cm from the base of the tobacco seedling stem to the bottom of the pot.

Post planting management: before and after the group planting period, it is also necessary to use a bib to supplement the matrix defects caused by natural settlement. The enclosure should be filled to the basic level of the planting basin.

(3) Nutrient Solution

Prepare nutrient solution using Tables 1 and 2. The specific preparation method is as follows: after the mother liquid is prepared, add 10 ml of iron salt mother liquid and 10 ml of trace element mother liquid per liter of the working solution. This nutrient solution adopts the management of trace element nutrients such as "high iron and boron", with an iron content of 0.5 mM and a boron content of 11 mg/L calculated as boric acid in the nutrient solution.

TABLE 1

Formula of large and important elements in nutrient solutions of different concentrations, mg/L

| Reagent | Nutrient Solution Concentration (Calculated in N) | | | |
| --- | --- | --- | --- | --- |
| | 0.01% | 0.03% | 0.045% | 0.06% |
| Calcium Nitrate Tetrahydrate | 272 | 816 | 1224 | 1632 |
| Potassium Nitrate | 380 | 1140 | 1710 | 2280 |
| Potassium Dihydrogen Phosphate | 108 | 324 | 486 | 648 |
| Triammonium Phosphate | 54 | 162 | 243 | 324 |
| Magnesium Sulfate | 246 | 738 | 1107 | 1476 |

TABLE 2

Formula for iron salts and trace elements in nutrient solution

| Iron Salt Mother Liquid, 500 mL, 0.02 mol/L, pH = 5.5 | Ferrous Sulfate Heptahydrate | 139.0 mg/L |
| --- | --- | --- |
| | EDTA-Na•2H₂O | 186.10 mg/L |
| Trace Element Mother liquid | Potassium Iodide | 0.83 mg/L |
| | Boric Acid | 11.0 mg/L |
| | Manganese Sulfate Tetrahydrate | 22.3 mg/L |
| | Zinc sulfate Heptahydrate | 8.6 mg/L |
| | Sodium Molybdate Dihydrate | 0.25 mg/L |
| | Copper Sulfate Pentahydrate | 0.025 mg/L |
| | Cobalt Chloride Hexahydrate | 0.025 mg/L |

After transplanting tobacco seedlings, the management methods for the use of nutrient solutions for cigars at different growth stages are shown in Table 3.

TABLE 3

Management methods for the use of nutrient solutions during different growth stages

| Growing Stage | 1-20 d | 21-30 d | 31-60 d | After 61 d |
| --- | --- | --- | --- | --- |
| Nutrient Solution Concentration (Calculated in N) | 0.03% | 0.045% | 0.06% | 0.045% |
| Solution Dosage (L per plant) | 4 | 6 | 8 | 8 |

In Table 3, specifically:
(1) On the 21st day, when supplementing the nutrient solution, adding the nutrient solution is 50% of the remaining nutrients in the nutrient solution tank before supplementation.
(2) On the 31st, 41st, and 51st days, it is necessary to replenish the nutrient solution once each time, and the amount of each supplement is 50% of the remaining nutrients in the nutrient solution tank before supplementation.
(3) On the 61st and 71st days, it is necessary to replenish the nutrient solution once each time, and the amount of each supplement is 50% of the remaining nutrients in the nutrient solution tank before supplementation.

Before the maturity period of cigar wrapper tobacco leaves: nutrient management is the main focus with water and fertilizer;

After the initial infusion, the amount of nutrient solution to be supplemented in the later stage should be supplemented according to the total loss of nutrient solution. Observe diligently. When the liquid level sinks by more than 2 cm, it is necessary to replenish nutrient solution in a timely manner, and the concentration should be designed according to the concentration of each growth stage.

After the maturity period of cigar wrapper tobacco leaves (after topping or harvesting the lower leaves), water management should be the main focus, and nutrient supply should be terminated in a timely manner. Terminate nutrient supply in a timely manner based on the opening of tobacco leaves and overall quality, in order to promote the full maturity of middle and upper leaves at the appropriate time.
(4) Control of Cultivation Environmental Factors Within the Production Facility System Temperature and humidity control: determine the spatial requirements of production facilities based on the number of layers of cigar cultivation and the height of tobacco plants. The temperature is 25±5° C. and the humidity is 80%±10%. The ambient temperature should be maintained at around 25° C. as much as possible. When it exceeds 35° C. and the humidity exceeds 85%, ventilation windows should be used in time to achieve cooling and dehumidification.

Light intensity control: the PPFD in the internal space of the production facility system is 75-160 μmol/(m²·s) (this range refers to the change in light intensity inside the facility under natural cloudy to natural sunny conditions).

Disease and pest control: prioritize the use of insect nets, and do not apply pesticides for root and stem diseases that do not occur. Medication recommendations include spraying 1000 times the concentration of Miesha Jie liquid (to prevent underground pests), and spraying 500 times the concentration of Bao Li Ke, Jia Shuang Ling, or Mao Tuo Bu Jin liquid (to prevent root and stem diseases).

Stability guarantee of tobacco plants: the stem of tobacco plants is fixed in a single line or single row double line manner.

(5) Top Pruning and Mature Harvesting

Top pruning: based on the growth of the tobacco plant, when the expected number of leaves reaches 19, the tobacco plant can be topped decisively and sprayed with universal tobacco sprout suppressant.

Mature harvesting: the lower leaves (including economically valuable foot leaves) are harvested 70 days after transplantation, with a 12 day interval between adjacent harvests.

3. Drying of Cigar Wrapper Tobacco Leaves

Harvesting shall be carried out according to the maturity standard of cigar wrappers. After harvesting, the tobacco leaves shall be hung in the drying area of the production facility system, or directly below the folding cantilever (i.e. drying bracket) on the vertical cultivation rack, and dried according to the current drying technology regulations of cigar wrappers.

4. Fermentation of Cigar Wrapper Tobacco Leaves

After the drying process is completed, the tobacco leaves are placed in the fermentation room and fermented according to the current fermentation technology regulations for cigar wrappers. The fermentation of cigar wrapped tobacco leaves is carried out in a detachable fermentation room constructed with a rolling film in the area left vacant after drying.

Example 2

The only difference between the high-yield integrated production method of cigar wrappers provided in Example 2 and embodiment 1 is the formula of the culture medium and the supplementary light measures. The formula of large and medium elements in the nutrient solution of in Example 2 is the same as that of embodiment 1, but the iron content is 0.3 mM calculated as Fe and the boron content is 13.0 mg/L calculated as boric acid. Specifically, the ferrous sulfate heptahydrate used is 83.4 mg/L, EDTA-Na■2H2O is 111.7 mg/L, and the boron content is 13.0 mg/L calculated as boric acid. The lower layer is supplemented with light at a PPFD of 50 μmol/(m²·s). The dosage of other nutrient solution components and process management measures are the same as in Example 1.

Example 3

The only difference between the high-yield integrated production method of cigar wrappers provided in Example 3 and Example 1 is the formula of the culture medium, the number of transplanting and planting layers, the supplementary light measures, and the number of planting seasons. The iron content is 0.7 mM calculated as Fe and the boron content is 9.5 mg/L calculated as boric acid. Specifically, the amount of ferrous sulfate heptahydrate used is 194.6 mg/L, EDTA-Na■2H2O is 260.57 mg/L, and the boron content calculated as boric acid is 9.5 mg/L. Transplant three layers, with the lower two layers receiving supplementary light at a PPFD of 150 μmol/(m²·s). Planting for three seasons with the first season transplanting in mid February and harvesting in mid June. The second season will be transplanted in mid June and harvested in mid October. Transplant in mid October of the third season and harvest in mid February of the following year. The dosage of other nutrient solution components and process management measures are the same as in Example 1.

Example 4

The only difference between the cigar wrappers production method provided in Example 4 and Example 1 is the cigar wrapper variety and the corresponding cultivation rack spacing and planting specifications. The cigar wrapper variety in this example is CX-12, and the cultivation rack spacing and planting row spacing that match the growth and development characteristics of this variety are 2.2 m and 1.2 m, respectively. Other supporting facilities, equipment, nutrient solution, light and other process management measures are the same as those in Example 1.

Comparative Example 1

The only difference between the cigar wrapper production method provided in this comparative example and Example 1 is the formula of the culture medium. The nutrient solution in this comparative example adopts the recommended iron and boron concentrations of traditional classic formulas, that is, the iron content is 0.1 mM calculated as Fe and the boron content is 2.86 mg/L calculated as boric acid. Specifically, the amount of ferrous sulfate heptahydrate used is 27.8 mg/L, EDTA-Na■2H$_2$O is 37.2 mg/L, and boric acid is 2.86 mg/L. The dosage of other nutrient solution components and process management measures are the same as in Example 1.

Comparative Example 2

The only difference between the cigar wrapper production method provided in this comparative example and Example 1 is the supply method of nutrient solution. The nutrient solution supply method in this comparative example is drip irrigation, which means that the prepared nutrient solution is injected into the stem base 3.5 cm by drip irrigation with drip irrigation tape. For the first 30 days, drip irrigation was carried out at a rate of 150 mL per plant in the morning. After 30 days, drip irrigation was carried out at a rate of 150 mL per plant in the morning and afternoon respectively (i.e. a total drip irrigation rate of 300 mL per plant per day). The nutrient concentration, facilities and equipment, and other process management measures at each stage were the same as in Example 1.

Comparative Example 3

The production method of cigar wrapper provided in this comparative example adopts the traditional cultivation method of cigar wrapper (i.e. the technical content of cigar cultivation in Chapter 20, Section 5 of "Chinese Tobacco Cultivation" (edited by the Institute of Tobacco Research, Chinese Academy of Agricultural Sciences, November 2005)). The cigar wrapper variety is CX-26, which includes the following steps:

S1, production facility requirements: conventional greenhouse seedling cultivation, conventional field outdoor transplanting, and completion of field planting and harvesting according to traditional production management methods.

S2, drying of cigar wrapper tobacco leaves by using traditional methods.

S3, the fermentation of cigar wrapped tobacco leaves by using traditional methods.

S4, implement single season planting according to traditional methods.

Text 1

The quality evaluation results, field disease occurrence, and cigar wrapper yield of the cigar wrapper tobacco leaves obtained from the investigation of implementation examples and comparative examples above. The quality indicators include leaf thickness, branch vein thickness, oil content, leaf surface evenness, and color uniformity. The indicators for disease occurrence are target leaf spot, anthracnose, and black shank disease. The evaluation results are shown in Table 4 below.

TABLE 4

Quality, disease incidence, yield and average price of cigar wrappers

| | Performance | Example 1 | Example 2 | Example 3 | Example 4 | Comparative Example 1 | Comparative Example 2 | Comparative Example 3 |
|---|---|---|---|---|---|---|---|---|
| Quality Indicators | Leaf Thickness/μm | 56.2 | 50.8 | 49.6 | 48.1 | 51.3 | 57.4 | 62.4 |
| | Branch Vein Thickness | Fine | Fine | Fine | Fine | Fine - Relatively Fine | Fine - Relatively Fine | Fine - Relatively Fine |
| | Oil Content | Sufficient | Sufficient | Sufficient | Sufficient | Sufficient-Relatively Sufficient | Sufficient | Sufficient-Relatively Sufficient |
| | Evenness | Even | Even | Even | Even | Even | Even-Relatively Even | Even-Relatively Even |
| | Color Uniformity | Uniform | Uniform | Uniform | Relatively Uniform | Uniform | Relatively Uniform-Uniform | Relatively Uniform |
| Disease Index | Black Shank Disease | 2.6 | 1.8 | 1.7 | 1.5 | 1.9 | 2.3 | 13.2 |
| | Anthracnose | 1.5 | 1.1 | 1.6 | 0.5 | 2.2 | 0.9 | 32.6 |
| | Target Leaf Spot | 0.5 | 0.6 | 0.2 | 0.1 | 0.7 | 0.3 | 22.4 |
| Yield Of Cigar Wrappers/% | | 71.48 | 72.09 | 73.18 | 72.18 | 53.62 | 65.23 | 14.83 |
| Average Price (RMB ¥/Kg) | | 143.26 | 148.96 | 149.07 | 148.73 | 111.36 | 137.65 | 81.18 |

Note:

the grading and pricing operation for examining the yield and average price of cigar wrappers shall be carried out in accordance with the local standard "Quality Specification for Cigar Tobacco Grade" DB 42/T 1549-2020 in Hubei Province.

From the results in Table 4, it can be observed that the new production method provided by Examples 1-4 of the present invention significantly outperforms the traditional production method (Comparative Example 3) in terms of leaf thickness, leaf surface evenness, etc., and the incidence of common diseases such as black shank, anthracnose, and target leaf spot are significantly reduced by comparing the inspection indicators of Comparative Examples. The yield and average price of cigar wrappers have significantly increased. Overall, the cigar wrapper tobacco leaves in Examples 1-4 have good maturity, sufficient oil content, thin leaves, fine and straight leaf veins, and uniform color. In addition, sensory quality evaluation shows that the examples has significant cigar aroma style characteristics, no obvious odors or impurities, moderate concentration, comfortable aftertaste, good combustibility, and overall quality significantly better than traditional production modes. Moreover, compared to traditional production methods, this production method can save more than 50% of land, reduce the investment in cigar production facilities by more than 40%, and reduce labor costs by more than 20%.

Due to the changes in the formula (especially iron and boron) and supply method of the nutrient solution in Comparative Examples 1 and 2, the yield of cigar wrappers has significantly decreased, and the average price has also dropped significantly.

The above examples only express the examples of the present invention, and their descriptions are more specific and detailed, but should not be understood as limiting the scope of the invention patent. It should be pointed out that for ordinary technical personnel in this field, several modifications and improvements can be made without departing from the inventive concept, which are within the scope of protection of the present invention. Therefore, the scope of protection of the present invention patent should be based on the appended claims.

What is claimed is:

1. A high-yield integrated production method for cigar wrappers, including the following steps:

building a "four in one" production facility system that integrates seedling cultivation, transplanting, drying, and fermentation processes of cigar wrapper tobacco leaves, with a photosynthetic photon flux density (PPFD) of 75-160 μmol/(m²·s), a temperature of 25±5° C. and a relative air humidity of 75%±10% within the production facility system;

during transplanting tobacco seedlings, supplying a nutrient solution comprising:

an iron content of 0.3-0.7 mM calculated as Fe; and a boron content of 9.5-13.0 mg/L calculated as boric acid;

wherein the nutrient solution is prepared by:

dissolving large and medium-sized elemental reagents in water to form a base solution, wherein the base solution comprises 272 mg/L calcium nitrate tetrahydrate, 404 mg/L potassium nitrate, 109 mg/L potassium dihydrogen phosphate, 61 mg/L triammonium phosphate and 246 mg/L magnesium sulfate, the base solution has a nitrogen concentration of 0.01% by mass (as pure N); and adding iron salt mother liquid and trace element mother liquid into the base solution, wherein the iron salt mother liquid comprises 83.40-194.60 mg/L ferrous sulfate heptahydrate and 111.65-260.55 mg/L chelating agent EDTA-Na■2H2O, the trace element mother liquid comprises 0.83 mg/L potassium iodide, 9.5-13.0 mg/L boric acid, 22.3 mg/L manganese sulfate tetrahydrate, 8.6 mg/L zinc sulfate heptahydrate, 0.25 mg/L sodium molybdate dihydrate, 0.025 mg/L copper sulfate pentahydrate, and 0.025 mg/L cobalt chloride hexahydrate;

supplying the nutrient solution during transplanting by one of batch addition and drip irrigation as follows:

during the 1st-20th day of the transplanting process, the concentration of the nutrient solution is 0.03% (as N) with a total dosage is 3-5 L per plant;

during the 21st-30th day of the transplanting process, the concentration of the nutrient solution is 0.045% (as N) with a total dosage of 5-7 L per plant; adding the nutrient solution on the 21st day is 50% of the remaining nutrients in the nutrient solution tank before adding the nutrient solution;

during the 31st-60th day of the transplanting process, the concentration of the nutrient solution is 0.06% (as N) with a total dosage is 7-10 L per plant; adding the nutrient solution once each on the 31st, 41st, and 51st days, and the amount of each supplement is 50% of the remaining nutrients in the nutrient solution tank before adding the nutrient solution;

from the 61st day of the transplanting process, the concentration of the nutrient solution is 0.045% (as N) with a total dosage is 7-10 L per plant; adding the nutrient solution once each on the 61st and 71st day, and the amount of each supplement is 50% of the remaining nutrients in the nutrient solution tank before adding the nutrient solution;

the transplantation of cigar wrapper tobacco leaves occupies the main space within the production facility system, and seedling cultivation, drying, and fermentation collectively occupy the remaining space within the production facility system; using 110-140 days as a cigar wrapper tobacco growing season, implement two or three seasons of intercropping per year.

2. The high-yield integrated production method for cigar wrappers according to claim 1, wherein 90% of the space in the production facility system is used for transplanting cigar wrapper tobacco leaves, and 10% is of the space in the production facility system used for seedling cultivation, drying, and fermentation of cigar wrapper tobacco leaves.

3. The high-yield integrated production method for cigar wrappers according to claim 1, wherein the transplanting is carried out using 2-3 layers of cultivation racks for transplanting cigar wrapper tobacco leaves with a spacing of ≥2 m between the layers of the cultivation racks; each layer of the cultivation rack except for the top layer adopts supplementary lighting measures with a supplementary PPFD of 50-150 μmol/(m²·s).

4. The high-yield integrated production method for cigar wrappers according to claim 1, wherein the seedling cultivation of cigar wrapper tobacco leaves is carried out by rolling seedling cultivation that is a 50 day cycle of intercropping; when using three season intercropping system, the second season seedling cultivation starts 50 days before the end of the first season tobacco harvest, and the third season seedling cultivation starts 50 days before the end of the second season tobacco harvest.

5. The high-yield integrated production method for cigar wrappers according to claim 1, wherein the drying of cigar wrapper tobacco leaves is carried out on a foldable drying rack in the drying area; the last season of tobacco leaves is dried on foldable tobacco racks or cultivation racks every year.

6. The high-yield integrated production method for cigar wrappers according to claim 1, wherein the fermentation of cigar wrapper tobacco leaves is carried out in a detachable fermentation room constructed with a retractable film in the area left vacant after drying.

\* \* \* \* \*